United States Patent [19]

Lieu

[11] Patent Number: 5,164,585
[45] Date of Patent: Nov. 17, 1992

[54] STYLUS/DIGITIZER COMBINATION WITH ELONGATE REFLECTORS AND LINEAR CCD

[75] Inventor: Yin S. Lieu, Hsinchu, Taiwan
[73] Assignee: Daniel Y. T. Chen, Taipei, Taiwan
[21] Appl. No.: 765,913
[22] Filed: Sep. 24, 1991
[51] Int. Cl.5 .............................................. G01V 9/04
[52] U.S. Cl. ..................................... 250/221; 340/707
[58] Field of Search .................... 250/221, 222.1, 229, 250/208.1, 208.2; 340/707, 708, 709

[56] References Cited

U.S. PATENT DOCUMENTS 4,517,559  5/1985  Deitch et al. ..................... 250/221
4,936,683  6/1990  Purcell ............................. 340/707

Primary Examiner—David C. Nelms
Attorney, Agent, or Firm—Stoel Rives Boley Jones & Grey

[57] ABSTRACT

A digitizer/stylus combination comprises a digitizer board and a stylus, thereby the stylus operating on the digitizer board and generating a corresponding image on a screen of a personal computer. The stylus has an LED (light emitting diode) disposed thereon and emits infrared light which includes a series of light spots. The digitizer board has a pair of reflectors disposed in two adjacent sides thereof, a pair of focusing lenses disposed opposite to the reflectors for focusing the light from the reflectors and a pair of CCD image receivers disposed behind the focusing lenses respectively for receiving an X beam and Y beam emitted from a light spot, thereby obtaining a real position of a light spot. The stylus further comprises two keys for application software use.

4 Claims, 3 Drawing Sheets

STYLUS/DIGITIZER COMBINATION WITH ELONGATE REFLECTORS AND LINEAR CCD

BACKGROUND OF THE INVENTION

This invention relates to a stylus/digitizer combination for an input device of a computer.

A conventional digitizer board for drawing in a computer system is divided into several different functional area thereof by operating a stylus to press a specific functional area and getting a corresponding required function. The interior of the digitizer board is structured with two layers with an upper layer composed of a plurality of longitudinal wires and a lower layer composed of a plurality of lateral wires, thereby forming a coordinate sensing matrix. The stylus has a magnetic coil which actuates a corresponding pair of points of the upper and lower layer to be engaged to each other and causing a required function when the stylus presses on a specific functional area. However, the digitizer board has drawback as follows:

1. large size: The digitizer board comprising a lot of wires in the upper layer and the lower layer which is implemented in two printed circuit boards requiring a lot of space. For example, a standard size of this digitized board is 12 inches square.

2. low resolution: The digitizer board having a limit of size causes a limit to its resolution.

3. high cost: The manufacturing of high density wires in a printed circuit board requires gold plating treatment which is expensive. Additionally, two layers of printed circuit boards need to be stacked together but separated in a very narrow distance, which is expensive also.

The inventor of the present invention develops a digitizer/stylus combination to overcome the drawbacks as described above.

SUMMARY OF THE INVENTION

The digitizer/stylus combination in the present invention comprises a digitizer and a stylus. The digitizer is formed as a square board, with two adjacent sides thereof disposed with two reflectors, two CCD (charge coupled device) image sensors disposed in the opposite side of the reflectors, and a CPU (central process unit) being engaged to the CCD image sensors. The stylus is disposed with an LED (light emitting diode) as a light source. When a user operate the stylus on the digitizer, the light emitted from the LED will be reflected through the reflectors to the CCD image sensors. One of the CCD image sensors senses the X component of light position as in vector coordinate system, while the other CCD image sensor the Y component. With the X and Y components constitutes a light spot on the screen of the computer.

It is an object of the present invention to provide a digitizer/stylus combination with CCD image sensors to replace the complicate wire matrix thereby having a smaller size than that of a conventional digitizer.

It is another object of the present invention to provide a digitizer/stylus combination with high resolution as 155 pixels per inch and high speed up to 200 reports per second.

It is another object of the present invention to provide a digitizer/stylus combination which has simpler structure than a conventional digitizer, and therefore cost less.

These and additional objects, if not set forth specifically herein, will be readily apparent to those skilled in the art from the detailed description provided hereunder, with appropriate reference to the accompanying drawings.

DETAILED DESCRIPTION OF THE PREFERRED EMBODIMENTS

Figure 2:
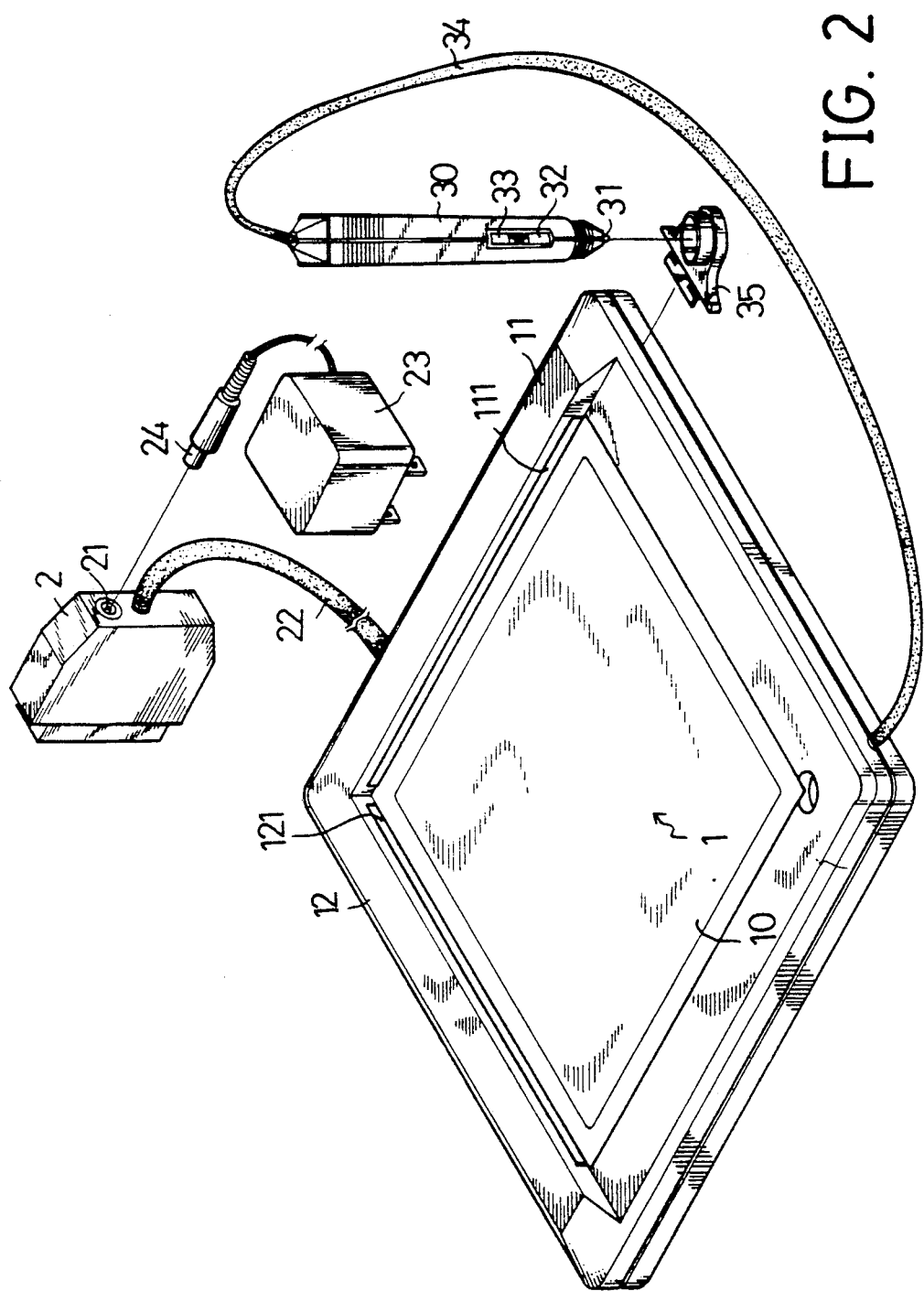
FIG. 2 is an assembly view of FIG. 1.

Referring to FIG. 2, a digitizer board 1 is a substantially square board, with a writing area 10 in the central part, a first protruding portion 11 and a second protruding portion 12 forming two adjacent sides thereof. The first and the second protruding portions 11, 12 are hollow. A first bar-like window 111 and a second bar-like window 121 are formed under the first protruding portion 11 and the second protruding portion 12 respectively to constitute two light channels for receiving an X beam and Y beam emitted from a light spot, thereby, obtaining a real position of a light spot. A series of light spots constitute a light curve which also passes through the bar-like windows 111, 121. The light spot is provided by a stylus 30 which is engaged to the digitizer board 1 by cable 34 for sending a command signal from the stylus 30 to the digitizer board 1. A stylus socket disposed in one side of the digitizer board 1 permitting the stylus to be inserted into when the stylus is on standby. The stylus 30 has an LED 31 on the top thereof for providing as a light source and on the body part thereof is disposed with two keys (31, 32) which are only for application software use, and are not in the scope of this invention.

The data transmission of the digitizer board 1 to a personal computer is carried out by a cable 22 and a connector 2 which is connected to a RS232 serial communication port of the personal computer. Additionally, the power supply of the digitizer board 1 also obtains from the power adapter through the cable 22 and the connector 2. This structure utilizes communication cable to transmit data and provide electric power reduces the amounts of cables and save spaces.

Figure 1:
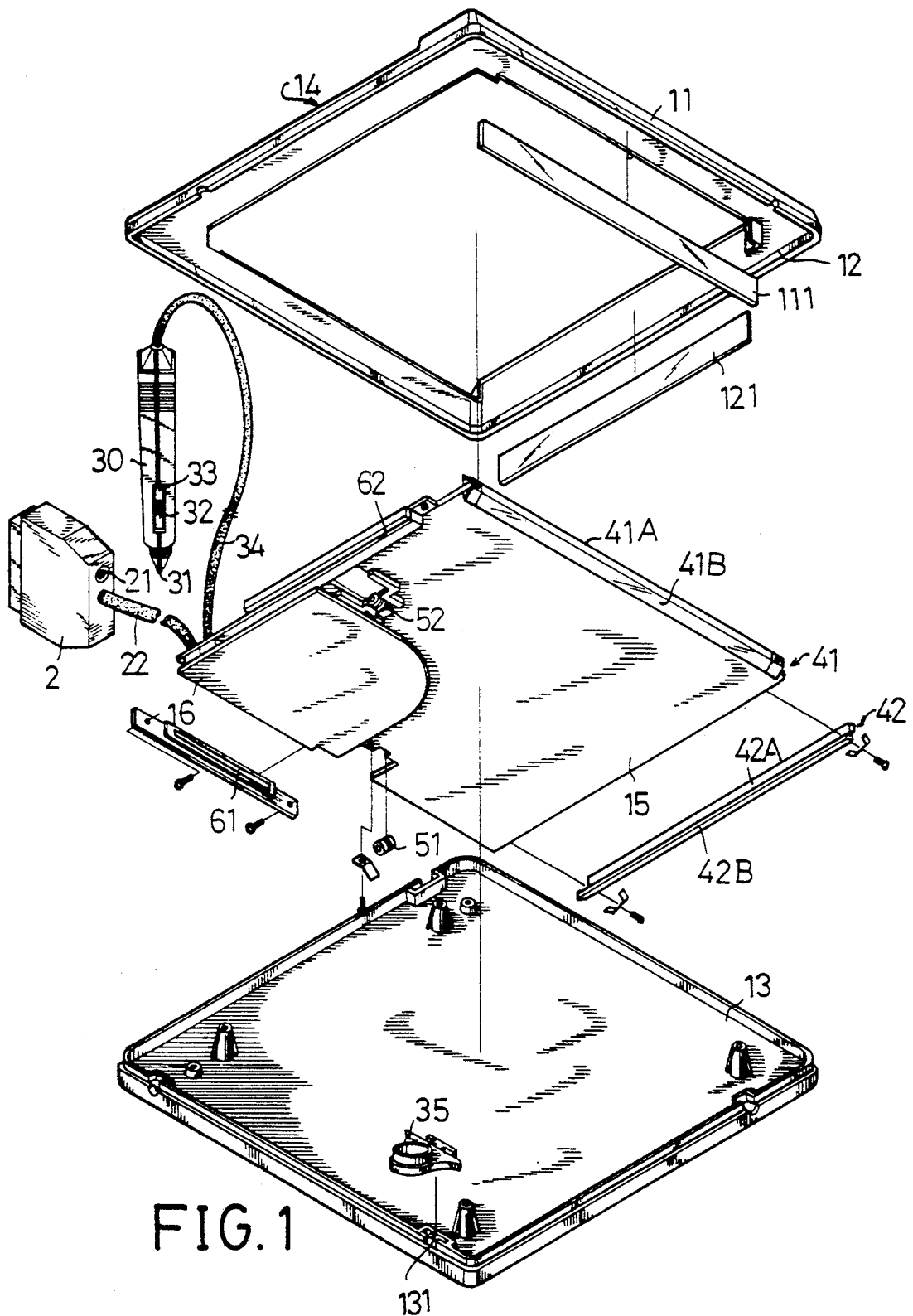
FIG. 1 is an exploded view of the present invention.

Referring to FIG. 1, an interior plate 15 is disposed inside the digitizer board 1 with an rectangular casing 14 set above. The first protruding portion 11 and the second protruding portion 12 are formed on the rectangular casing 14. A first reflector means 41 is disposed in one side of the interior plate 15, in a position corresponding to the first protruding portion 11, and a second reflector means 42 is disposed in adjacent to the first reflector means 41 in a position corresponding to the second protruding portion 12. Each of the two reflector means 41, 42 is composed of two bar-like reflectors 41A, 41B, and 42A, 42B, with the bar-like reflector 41A engaged to 41B in a right angle, the same to reflectors 42A and 42B.

Figure 3:
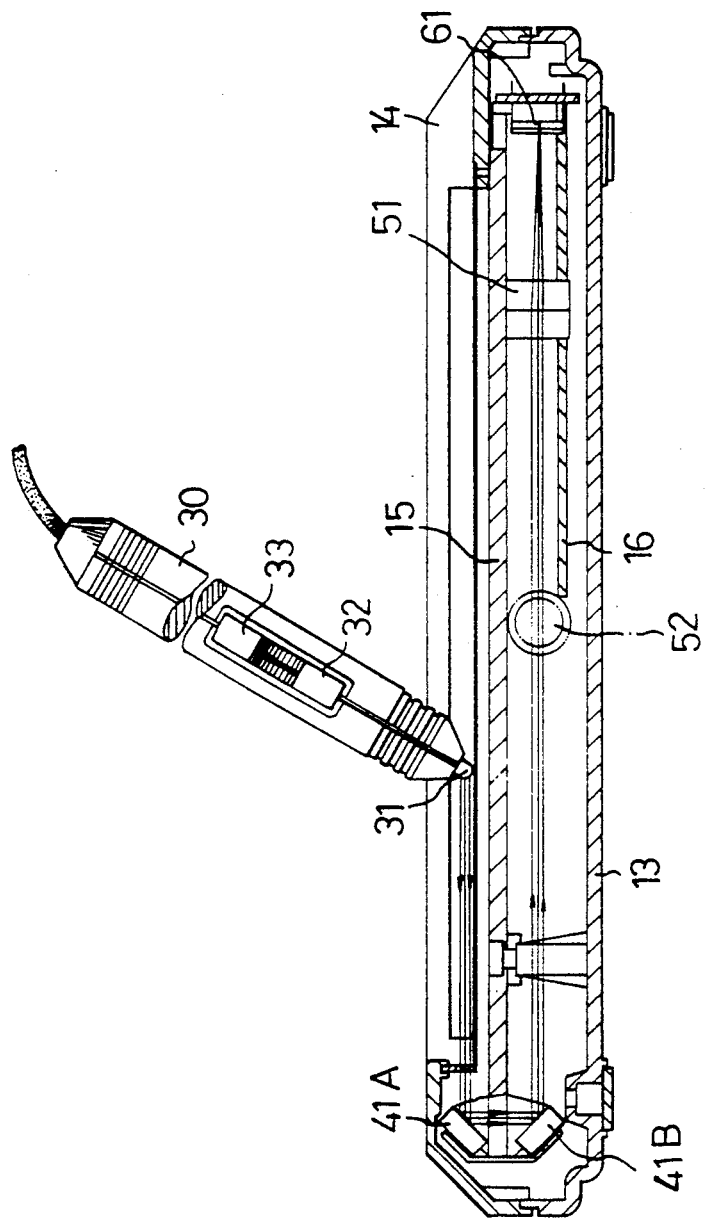
FIG. 3 is a sectional diagram showing the light receiving mechanics in the invention.

Referring to FIG. 3, the first reflector means 41 engaged to the interior plate 15, with each bar-like reflector 41A and 41B having a 45 degree offset to the interior plate 15.

Referring to FIG. 1 again, a first focus lens 51 is disposed opposite to the first reflector means 41 on the interior plate 15 for focusing the light from the first reflector means 41, and a second focus lens 52 is disposed opposite to the second reflector means 42 on the interior plate 15 for focusing the light from the second reflector means 42. A first linear CCD image receiver 61 is disposed opposite to the first reflector means 41 and disposed under one side of the interior plate 15 for receiving the light from the first focusing lens 51. A second linear CCD image receiver 62 is disposed opposite to the second reflector means 42 and disposed under one side of the interior plate 15 for receiving the light from the second focusing lens 52. The first and the second linear CCD image receiver 61, 62 receives the light signal and convert the light signal to electric signal and send the electric signal to an image processing circuit 16. The image processing circuit 16 utilizes a mathematical algorithem technique to process the electric signal to a corresponding X, Y coordinates which together represent a specific light spot and shows a corresponding cursor point in a screen of a personal computer.

While the present invention has been explained in relation to its preferred embodiment, it is to be understood that various modifications thereof will be apparent to those skilled in the art upon reading this specification. Therefore, it is to be understood that the invention disclosed herein is intended to cover all such modifications as fall within the scope of the appended claims.

I claim:

1. A digitizer/stylus combination comprises a digitizer board and a stylus, thereby the stylus operating on the digitizer board and generating a corresponding image on a screen of a personal computer, characterized in said stylus having an LED (light emitting diode) disposed thereon and emitting infrared light which includes a series of light spots when said stylus is actuated and moved by a user, and said digitizer board comprising:

a rectangular casing with a first protruding portion and a second protruding portion formed on two adjacent sides thereof;

a first bar-like window and a second bar-like window being formed under said first protruding portion and said second protruding portion respectively for constituting two light channels for receiving an X beam and Y beam emitted from a light spot which is provided by said stylus, thereby obtaining a real position of said light spot, a series of said light spots constituting a light curve which also passes through said bar-like windows;

an interior plate being disposed under the rectangular casing for providing a writing area thereon;

a first reflector means being disposed in one side of said interior plate, in a position corresponding to said first protruding portion, and a second reflector means being disposed in adjacent to said first reflector means in a position corresponding to said second protruding portion, each of said reflector means being composed of two bar-like reflectors, first upper reflector, first lower reflector, second upper reflector, and second lower reflector, wherein said first upper reflector engaged to s id first lower reflector with a right angle therebetween, said second upper reflector engaged to said second lower reflector with a right angle therebetween; a first focus lens being disposed opposite to said first reflector means on said interior plate for focusing the light from said first reflector means, and a second focus lens being disposed opposite to said second reflector means on said interior plate for focusing the light from the second reflector means; and a first linear CCD image receiver being disposed opposite to said first reflector means and disposed under one side of said interior plate right behind said first focusing lens for receiving the light therefrom and converting the light to first electrical signal which represents an X component of a specific light spot, and a second linear CCD image receiver being disposed opposite to said second reflector means, disposed under one side of said interior plate behind said second focusing lens for receiving the light therefrom and converting the light to a second electrical signal which represents a Y component of said specific light spot, said first electrical signal and said second electrical signal being coupled to an image processing circuit which utilizes a ROM mapping technique to process said electric signal to a corresponding X, Y coordinates which together represent said specific light spot and shows a corresponding cursor point in a screen of a personal computer.

2. The digitizer/stylus combination as claimed in claim 1 wherein said first reflector means engaged to said interior plate, with said first upper reflector and said first lower reflector each having a 45 degree offset to said interior plate respectively.

3. The digitizer/stylus combination as claimed in claim 1 wherein said stylus is further disposed with an input button for a user to press to input the light tracking to the digitizer board and record the light tracking in the computer and further shows a corresponding image of the light tracking on a screen.

4. The digitizer/stylus combination as claimed in claim 3 wherein said stylus is further disposed with an erase button for a user to press to erase a light tracking already shown in the screen.

* * * * *